(12) United States Patent
Akamatsu et al.

(10) Patent No.: US 11,261,879 B2
(45) Date of Patent: Mar. 1, 2022

(54) FLUID MACHINE

(71) Applicant: IHI Corporation, Tokyo (JP)

(72) Inventors: Yosuke Akamatsu, Tokyo (JP); Gen Kuwata, Tokyo (JP); Kentaro Yamada, Tokyo (JP)

(*) Notice: Subject to any disclaimer, the term of this patent is extended or adjusted under 35 U.S.C. 154(b) by 134 days.

(21) Appl. No.: 16/808,387

(22) Filed: Mar. 4, 2020

(65) Prior Publication Data

US 2020/0200188 A1 Jun. 25, 2020

Related U.S. Application Data

(63) Continuation of application No. PCT/JP2017/031929, filed on Sep. 5, 2017.

(51) Int. Cl.
| | |
|---|---|
| *F04D 29/58* | (2006.01) |
| *F04D 29/08* | (2006.01) |
| *F04D 29/28* | (2006.01) |
| *F04D 29/42* | (2006.01) |

(52) U.S. Cl.
CPC ............. *F04D 29/58* (2013.01); *F04D 29/08* (2013.01); *F04D 29/281* (2013.01); *F04D 29/4206* (2013.01)

(58) Field of Classification Search
CPC .............................. F04D 29/5806; F04D 29/08
See application file for complete search history.

(56) References Cited

U.S. PATENT DOCUMENTS

| | | | |
|---|---|---|---|
| 4,931,678 A * | 6/1990 | Lutz | H02K 11/28 310/62 |
| 6,102,672 A | 8/2000 | Woollenweber et al. | |
| 2009/0044548 A1* | 2/2009 | Masoudipour | F04D 29/057 62/115 |

(Continued)

FOREIGN PATENT DOCUMENTS

| | | |
|---|---|---|
| EP | 0784369 | 7/1997 |
| FR | 1543943 | 10/1968 |

(Continued)

OTHER PUBLICATIONS

Translation of JP58138295 (Year: 1983).*

(Continued)

*Primary Examiner* — Eldon T Brockman
*Assistant Examiner* — Brian O Peters
(74) *Attorney, Agent, or Firm* — Soei Patent & Law Firm

(57) ABSTRACT

This fluid machine includes a motor housing, a rotating shaft which is inserted through the motor housing, an impeller which is mounted on a protruding portion of the rotating shaft, and a facing portion which faces the motor housing on a first end side in the axial direction. A first opening is provided on the first end side of the motor housing, a second opening is provided on a second end side of the motor housing, and an in-housing passage fluidly couples the first opening with the second opening. The fluid machine further includes an exhaust passage which is formed between the motor housing and the facing portion and which fluidly couples the first opening with external air, and a rotating blade which is disposed between the first opening and the exhaust passage, wherein the rotating blade is mounted on the rotating shaft and is rotatable with the rotating shaft.

19 Claims, 5 Drawing Sheets

(56) References Cited

U.S. PATENT DOCUMENTS

2009/0291004 A1 11/2009 Grasmuck
2014/0127050 A1 5/2014 Oda et al.

FOREIGN PATENT DOCUMENTS

| | | |
|---|---|---|
| GB | 2079852 | 1/1982 |
| JP | S51-068003 | 5/1976 |
| JP | S58-106599 | 7/1983 |
| JP | S58-138295 | 8/1983 |
| JP | H2-207199 | 8/1990 |
| JP | H8-277800 | 10/1996 |
| JP | H9-098913 | 4/1997 |
| JP | 2000-236639 | 8/2000 |
| JP | 2001-515991 | 9/2001 |
| JP | 2001-295792 | 10/2001 |
| JP | 2006-219990 | 8/2006 |
| JP | 2017-166330 | 9/2017 |
| WO | 2013/011939 | 1/2013 |

OTHER PUBLICATIONS

International Search Report dated Nov. 21, 2017 for PCT/JP2017/031929.
International Preliminary Report on Patentability with Written Opinion dated Mar. 19, 2020 for PCT/JP2017/031929.
Extended Search Report in corresponding European Application No. 17924225.0, dated Feb. 23, 2021.

* cited by examiner

FLUID MACHINE

CROSS-REFERENCE TO RELATED APPLICATION

This application is a continuation application of PCT Application No. PCT/JP2017/031929, filed Sep. 5, 2017, the entire contents of which are incorporated herein by reference.

BACKGROUND

A fluid machine such as a centrifugal blower or a compressor may include a motor having a rotor and a coil which surrounds the rotor. The rotor of the motor is rotated by a magnetic field generated by the coil. An impeller is mounted on the rotor, and the fluid machine suctions air by rotating the impeller. When a rotating magnetic field is generated from the coil and the rotor rotates, the coil and the rotor generate heat, and a temperature of the motor may increase. When the temperature of the motor increases, the rotational efficiency of the motor decreases, and the operational efficiency of the blower and the compressor decreases.

A known method for cooling the motor includes circulating an air flow around the motor in a process in which the air flow is suctioned and exhausted to the outside by rotating the impeller. For example, in a configuration described in Japanese Unexamined Patent Publication No. 2000-236639, air is taken in from a wind guide port of a fan case, and the air is guided to a blade portion of the fan. The air is delivered from a diffuser into the inside of the motor case where it passes around an insulating slot formed in an iron core of the rotor of the motor. The air cools the motor and is then exhausted to the outside of the motor case.

SUMMARY

The temperature of the air flow, such as external air, affects the ability of the air flow to cool the motor. For example, when a temperature of the main flow is high, the ability of the air flow to be used as cooling air may be diminished. A fluid machine configured to suction external air as cooling air separately from a main air flow may be used to more efficiently cool the motor.

An example fluid machine disclosed herein includes a motor housing comprising a first end and a second end in an axial direction, a rotating shaft inserted through the motor housing, and an impeller mounted on the protruding portion of the rotating shaft. In some examples, the rotating shaft comprises a protruding portion that protrudes from the first end or the second end of the motor housing. The example fluid machine further includes a facing portion that faces the first end of the motor housing in the axial direction, a first opening provided on a side (e.g., the left side or left half) of the motor housing associated with the first end of the motor housing, a second opening provided on an opposite side (e.g., the right side or right half) of the motor housing associated with the second end of the motor housing, and an in-housing passage formed in the motor housing. In some examples, the second opening is configured to communicate with external air, and the in-housing passage is configured to fluidly couple the first opening with the second opening.

Additionally, the example fluid machine may include an exhaust passage formed between the motor housing and the facing portion and configured to fluidly couple the first opening with the external air, and a rotating blade disposed between the first opening and the exhaust passage, wherein the rotating blade is mounted on the rotating shaft and is rotatable with the rotating shaft.

In some examples, the second opening, the in-housing passage, the first opening, and the exhaust passage may be fluidly coupled with each other. When the rotating blade rotates together with the rotating shaft, external air is suctioned from the second opening and flows through one or more openings and passages. The motor can be cooled by the external air flowing in the motor housing. Thus, the external air is suctioned into the motor housing as cooling air separately from a main air flow.

In some examples, the impeller is mounted on the protruding portion that protrudes from the first end of the motor housing, the facing portion is disposed between the motor housing and the impeller, and a part of a back surface of the impeller is located on a motor housing side of the facing portion. The facing portion defines a passage of the main flow generated by the impeller and a passage of the cooling air flowing in the motor housing. Since a part of the back surface of the impeller is located on the motor housing side of the facing portion, downsizing in the axial direction is achieved.

In some examples, a coil is fixed to an inner peripheral surface of the motor housing, and the motor housing comprises a groove which is formed on the inner peripheral surface and extends in the axial direction over a region in which the coil is provided. Accordingly, the cooling air readily flows through the groove in the motor housing to efficiently cool the coil.

In some examples, the coil is spaced apart from the first end and the second end of the motor housing in the axial direction so that external air is readily introduced into the groove in the motor housing in order to improve the cooling efficiency of the coil.

In some examples, the fluid machine further includes a cooling fan comprising the rotating blade, wherein the cooling fan comprises a boss portion through which the rotating shaft is inserted. Additionally, the impeller is mounted on the protruding portion protruding from the first end of the motor housing, the rotating shaft comprises a step portion facing the back surface of the impeller, and the cooling fan is mounted on the rotating shaft by the boss portion being sandwiched between the impeller and the step portion of the rotating shaft. The cooling fan may be mounted on the rotating shaft using the impeller and the step portion provided on the rotating shaft in order to save space in the axial direction.

In some examples, the impeller is screwed into the protruding portion that protrudes from the first end of the motor housing, and the impeller presses the boss portion of the cooling fan on the back surface of the impeller. Accordingly, the cooling fan can be securely and readily mounted on the rotating shaft by screwing the impeller into the rotating shaft.

In some examples, the rotating blade comprises an inner end portion which is located closer to the rotating shaft as compared to an outer end portion which is located farther from the rotating shaft. The rotating blade extends between the inner end portion and the outer end portion, and the outer end portion is located upstream from the inner end portion in a rotational direction of the rotating shaft. The rotation of the rotating blade may be configured to efficiently create an air flow from the in-housing passage to the exhaust passage.

In some examples, the first opening is located inward from the outer end portion which is farther from the rotating shaft of the rotating blade in order to improve the efficiency of suction of the cooling air from the inside of the motor housing due to the rotating blade.

In some examples, the fluid machine comprises a seal portion formed on an inner diameter side of the facing portion in order to seal the motor housing and the impeller.

DETAILED DESCRIPTION

Figure 1:
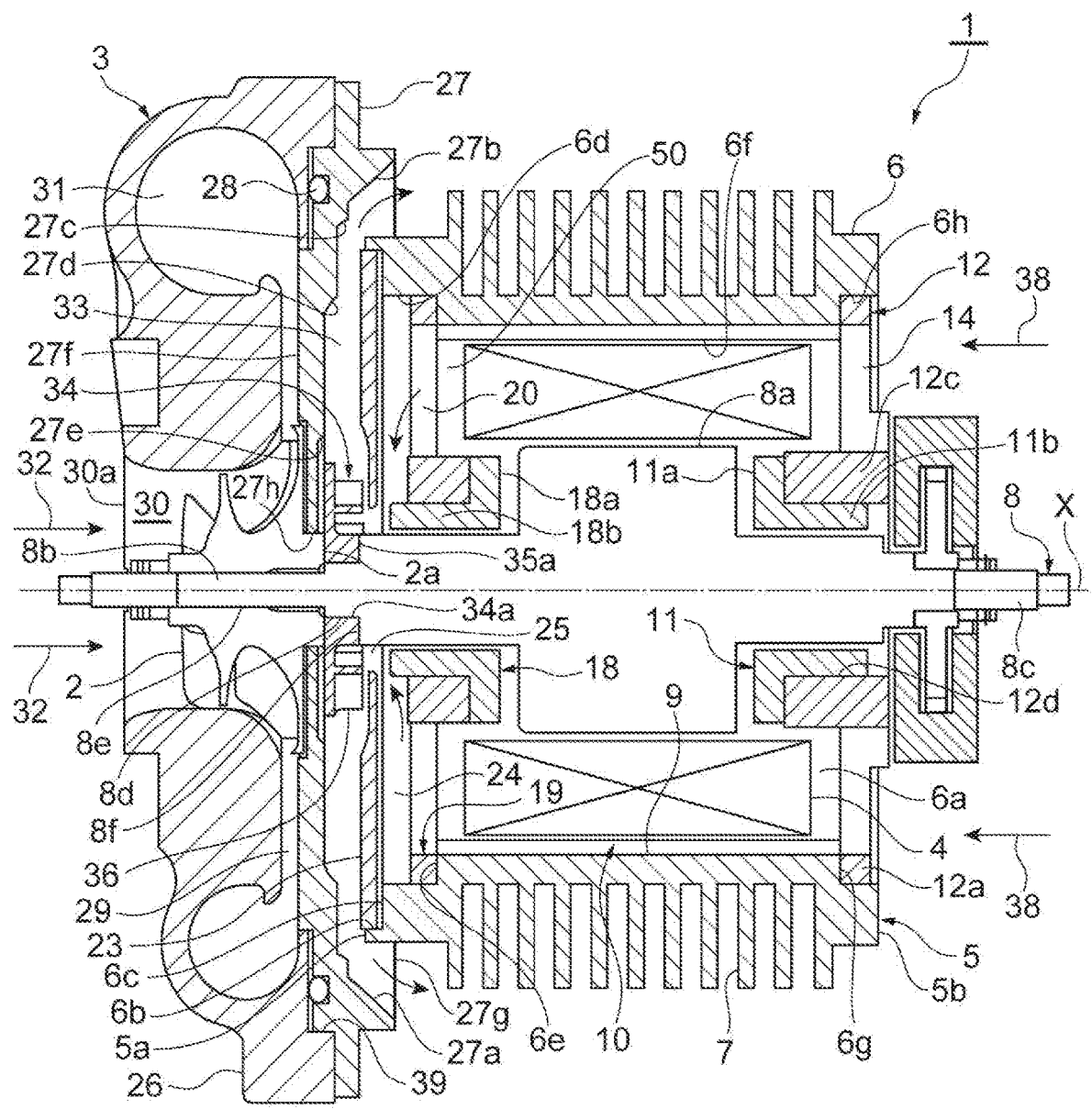
FIG. 1 is a cross-sectional view showing an example fluid machine.

In the following description, with reference to the drawings, the same reference numbers are assigned to the same components or to similar components having the same function, and overlapping description is omitted.

An example fluid machine will be described with reference to FIG. 1, in which the left side of the drawing is referred to as a tip end (a first end) side, and the right side of the drawing is referred to as a base end (a second end) side. Additionally, the terms "tip end side" and "base end side" may be used with reference to an axial direction of the fluid machine.

In some examples, the fluid machine may comprise a centrifugal blower 1. The centrifugal blower 1 is, for example, an air-cooled electric blower which suctions air and sends it out at a predetermined pressure. The centrifugal blower 1 has an air suction port on the tip end side. The centrifugal blower 1 includes an impeller housing 3 in which an impeller 2 is accommodated, and a motor housing 5 in which a coil 4 serving as a rotation drive portion for rotating the impeller 2 is accommodated.

The motor housing 5 includes a cylindrical motor housing main body portion 6. Radiation fins 7 are formed on an outer peripheral surface of the motor housing main body portion 6. The motor housing main body portion 6 includes a first end 5a on the tip end side and a second end 5b on the base end side in the axial direction. The motor housing main body portion 6 has an insertion hole 6a which extends in the axial direction between the first end 5a and the second end 5b. A rotating shaft 8 made of, for example, stainless steel is inserted through the motor housing main body portion 6.

The rotating shaft 8 is supported by a first bearing portion 18 provided in the vicinity of the first end 5a in the motor housing main body portion 6, and a second bearing portion 11 provided in the vicinity of the second end 5b in the motor housing main body portion 6. The rotating shaft 8 is rotatable about a rotation axis X thereof.

The rotating shaft 8 has a first end portion 8b which protrudes from the first end 5a of the motor housing main body portion 6 in the axial direction associated with the rotation axis X and a second end portion 8c which protrudes from the second end 5b of the motor housing main body portion 6 in the axial direction. The impeller 2 made of, for example, aluminum is mounted on the first end portion 8b which is a protruding portion of the rotating shaft 8. In some examples, a through-hole is formed in the impeller 2 in the rotation axis X, and the first end portion 8b of the rotating shaft 8 is inserted through the through-hole. For example, a male screw is formed on a peripheral surface of the first end portion 8b. A boss portion 2a which protrudes in a back surface direction is formed in the center of the impeller 2 on the base end side.

The motor housing main body portion 6 includes a first opening portion formed on the tip end side of the insertion hole 6a and a second opening portion formed on the base end side of the insertion hole 6a. The insertion hole 6a includes a first cylindrical portion 6b which extends from the first opening portion to the base end side, and an annular first step portion 6c which reduces a diameter from the first cylindrical portion 6b. Additionally, the insertion hole 6a may include a second cylindrical portion 6d which extends from the first step portion 6c to the base end side, and an annular second step portion 6e which reduces a diameter of the second cylindrical portion 6d. Still further, the insertion hole 6a may include a third cylindrical portion 6f which extends from the second step portion 6e to the base end side, an annular third step portion 6g which increases a diameter of the third cylindrical portion 6f, and a fourth cylindrical portion 6h which extends from the third step portion 6g to the second opening portion. In some examples, a diameter of the first cylindrical portion 6b is larger than the diameter of the second cylindrical portion 6d. Each of the diameter of the second cylindrical portion 6d and a diameter of the fourth cylindrical portion 6h may be larger than the diameter of the third cylindrical portion 6f. The third cylindrical portion 6f is the portion which has the smallest diameter in the insertion hole 6a of the motor housing main body portion 6, for example.

A rotor 8a is fixed to a central portion of the rotating shaft 8 in the axial direction. An outer diameter of the rotor 8a may be larger than other portions of the rotating shaft 8. The rotor 8a includes a magnetic field generating source such as a permanent magnet. The rotor 8a is accommodated in the motor housing main body portion 6. In some examples, both ends of the rotor 8a in the axial direction are located between the first end 5a and the second end 5b of the motor housing main body portion 6.

The coil 4 is provided inside the motor housing main body portion 6. The coil 4 is, for example, an electromagnetic coil or other type of drive coil. The coil 4 is fixed to the third cylindrical portion 6f (the inner peripheral surface) of the motor housing main body portion 6. The coil 4 may include, for example, a conductive wire and a stator core which is an iron core on which the conductive wire is wound. The coil 4 is disposed around the rotor 8a and faces the rotor 8a with a gap therebetween. An example motor 10 includes the stator including the coil 4 and the rotor 8a. The coil 4 can be energized via a wiring. A rotating magnetic field is generated between the coil 4 and the rotor 8a by energizing the coil 4, so that the rotor 8a rotates.

An example arrangement of the coil 4 will be described in more detail. The coil 4 is spaced apart from the first end 5a and the second end 5b of the motor housing 5 in the axial direction. In some examples, the coil 4 is shorter than a length between the first end 5a and the second end 5b in the axial direction. Additionally, the coil 4 may be shorter than a length of the third cylindrical portion 6f in the axial direction. The coil 4 is accommodated in the third cylindrical portion 6f.

One or more grooves 9 are provided in the motor housing main body portion 6. When a direction in which the groove 9 extends is divided into an axial component and a circumferential component, the direction in which the groove 9 extends includes at least the axial component. The groove 9 is formed in, for example, the third cylindrical portion 6f and is connected to the second step portion 6e and the third step portion 6g. A bottom portion of the groove 9 (a portion farthest from the rotation axis X) is spaced apart from the coil 4 provided in the third cylindrical portion in a radial direction. The groove 9 defines a space which extends in the axial direction on the outer peripheral side of the coil 4.

In some examples, a plurality of grooves 9 are formed. The plurality of grooves 9 are formed, for example, at a predetermined angular pitch. For example, six grooves 9 are formed at an angular pitch of 60°. The plurality of grooves 9 extend in the axial direction and may be parallel to each other. The one or more grooves 9 may extend spirally around the rotation axis X.

The one or more grooves 9 may extend in the axial direction over a region in which the coil 4 is provided. In some examples, the one or more of the plurality of grooves 9 may be longer than a length of the coil 4 in the axial direction.

A portion of the rotating shaft 8 located on the tip end side from the rotor 8a is supported by the first bearing portion 18. A portion of the rotating shaft 8 located on the base end side from the rotor 8a is supported by the second bearing portion 11. Accordingly, the rotating shaft 8 may be rotatably supported by the first bearing portion 18 and the second bearing portion 11. The first bearing portion 18 includes a cylindrical support portion 18b which faces the rotating shaft 8 and supports the rotating shaft 8, and a flange portion 18a which is provided at a base end portion of the support portion 18b in the axial direction and protrudes outward in the radial direction. The second bearing portion 11 includes a cylindrical support portion 11b which faces the rotating shaft 8 and supports the rotating shaft 8, and a flange portion 11a which is provided at a tip end portion of the support portion 11b in the axial direction and protrudes outward in the radial direction.

A first bearing plate 19 is fitted to the second cylindrical portion 6d of the motor housing main body portion 6. The first bearing plate 19 is an annular member which is fitted to the first end 5a side of the motor housing main body portion 6 and holds the first bearing portion 18. A second bearing plate 12 is fitted to the fourth cylindrical portion 6h of the motor housing main body portion 6. The second bearing plate 12 is an annular member which is fitted to the second end 5b side of the motor housing main body portion 6 and holds the second bearing portion 11.

In some examples, the first bearing plate 19 may have the same structure as the second bearing plate 12. The first bearing plate 19 and the first bearing portion 18 have, for example, a structure which is plane-symmetric with the second bearing plate 12 and the second bearing portion 11 with respect to a plane that is perpendicular to the rotation axis X. Hereinafter, the second bearing plate 12 will be described in further detail with reference to FIGS. 1 and 2, and detailed description of the first bearing plate 19 will be omitted.

Figure 2:
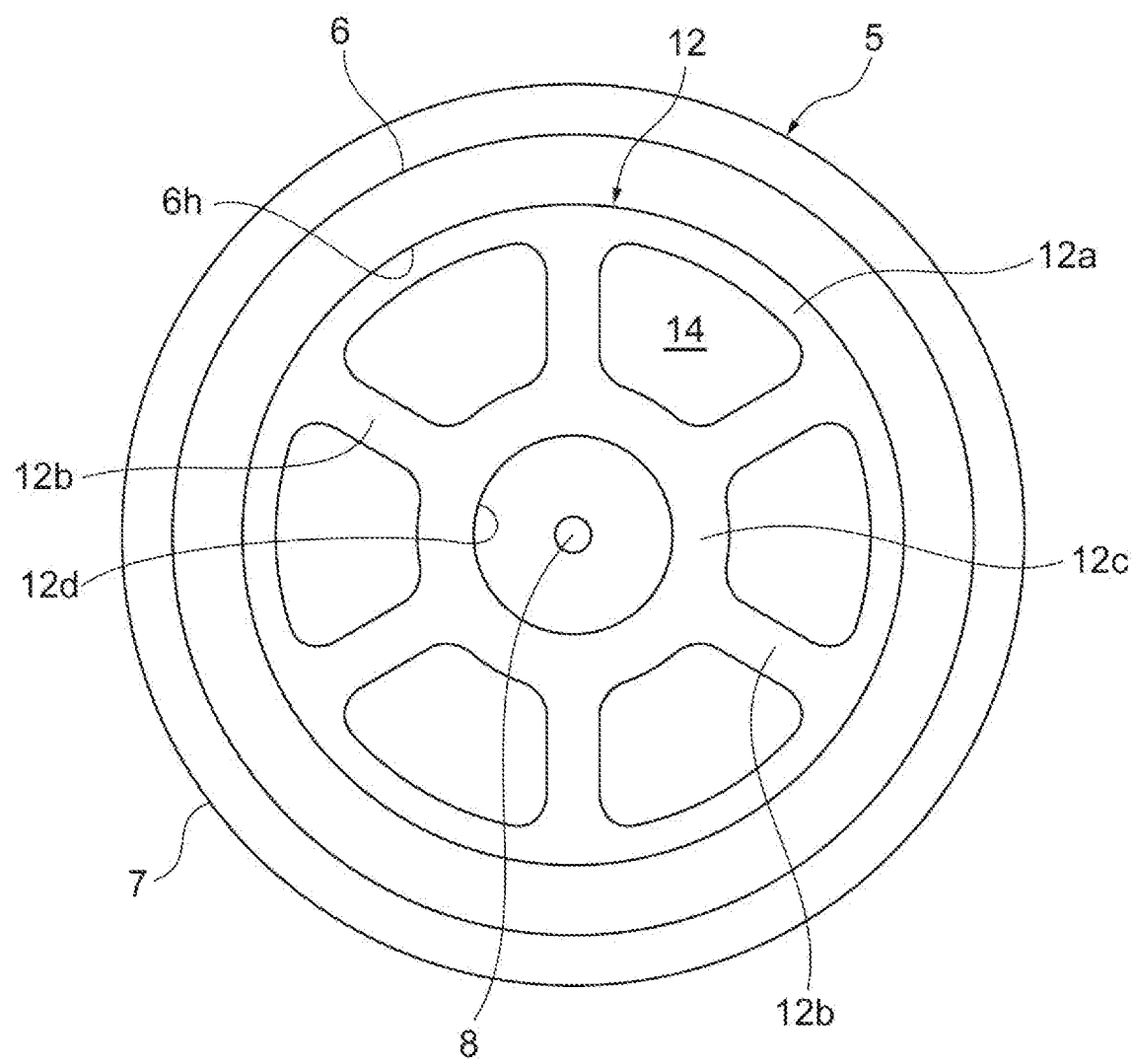
FIG. 2 is a diagram showing an example motor housing.

As shown in FIG. 2, the second bearing plate 12 includes an annular rim portion 12a fitted to the fourth cylindrical portion 6h of the motor housing main body portion 6, a cylindrical hub portion 12c to which the second bearing portion 11 is fixed, and a plurality of spoke portions 12b which connect the rim portion 12a to the hub portion 12c. An insertion hole 12d is formed in and passes through the hub portion 12c in the axial direction. The support portion 11b and the rotating shaft 8 supported by the support portion 11b are inserted through the insertion hole 12d.

The rim portion 12a of the second bearing plate 12 is fitted into the fourth cylindrical portion 6h of the motor housing main body portion 6 and is fixed to the third step portion 6g by a bolt or the like. The flange portion 11a of the second bearing portion 11 is fixed to the hub portion 12c of the second bearing plate 12 with a bolt or the like. Thus, the second bearing portion 11 is fixed to the hub 12c. The second bearing plate 12 restricts displacement of the second bearing portion 11 in the axial direction and the radial direction.

A plurality of intake ports (second openings) 14 are provided on and pass through the outer peripheral side of the hub portion 12c of the second bearing plate 12 in the axial direction. The intake ports 14 are fluidly coupled with a space of the motor housing main body portion 6 on the second end 5b side and an opening of the third cylindrical portion 6f on the base end side. The intake ports 14 form a region between the rim portion 12a and the hub portion 12c which is not blocked by the spoke portions 12b.

The intake ports 14 are provided on the second end 5b side of the motor housing 5, and are fluidly coupled with both the external air and the insertion hole 6a of the motor housing main body portion 6. In the second bearing plate 12, the plurality of intake ports 14 are formed at a predetermined angular pitch, for example. A filter such as a dust filter may be provided in each of the intake ports 14.

On the other hand, the first bearing plate 19 also includes a rim portion, a hub portion, and a plurality of spoke portions. The rim portion of the first bearing plate 19 is fitted into the second cylindrical portion 6d of the motor housing main body portion 6 and is fixed to the second step portion 6e. The flange portion 18a of the first bearing portion 18 is fixed to the hub portion of the first bearing plate 19. The first bearing plate 19 restricts displacement of the first bearing portion 18 in the axial direction and the radial direction. A plurality of openings 20 are formed on the outer peripheral side of the hub portion, for example, at a predetermined angular pitch. The opening 20 is fluidly coupled with the opening of the third cylindrical portion 6f on the tip end side. For example, the opening 20 is fluidly coupled with the insertion hole 6a of the motor housing main body portion 6.

Figure 3A:
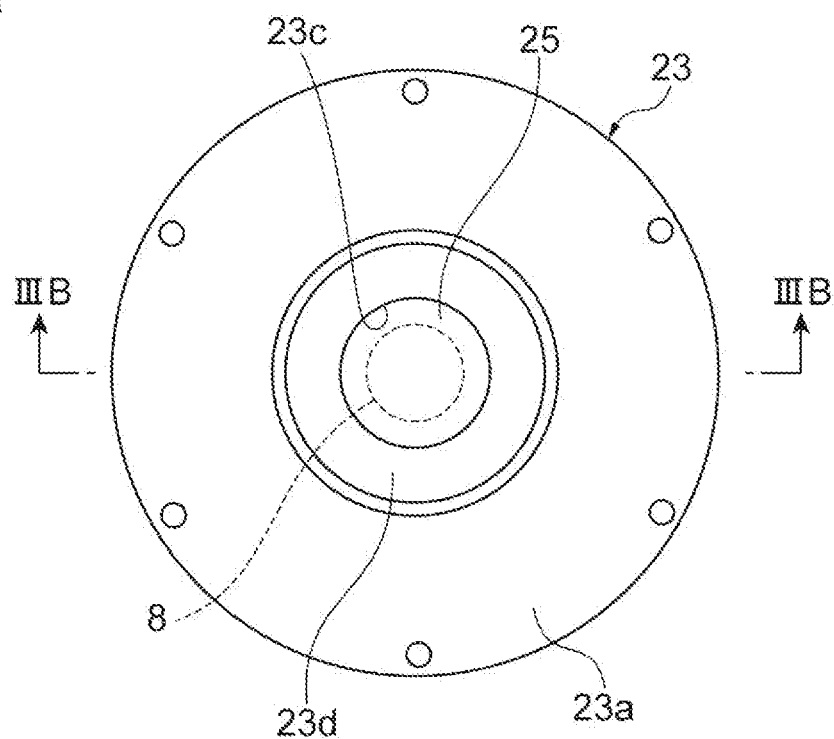
FIG. 3A is a front view showing a passage forming plate in FIG. 1.

Next, an example passage forming plate 23 provided at the first end 5a of the motor housing 5 will be described with reference to FIG. 1 and FIGS. 3A to 3C. As shown in FIG. 1 and FIG. 3A, the annular passage forming plate 23 is fitted to the first cylindrical portion 6b of the motor housing main body portion 6. The passage forming plate 23 includes an annular outer peripheral plate portion 23a fitted to the first cylindrical portion 6b, and an inner peripheral plate portion 23b which is integrally formed with and/or extends contiguously from the inside of the outer peripheral plate portion 23a. A circular passage forming hole 23c which is formed in and passes through the center of the inner peripheral plate portion 23b in the axial direction.

Figure 3B:
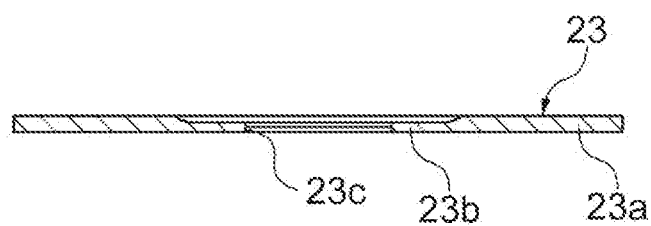
FIG. 3B is a cross-sectional view along line IIIB-IIIB in FIG. 3A.
Figure 3C:
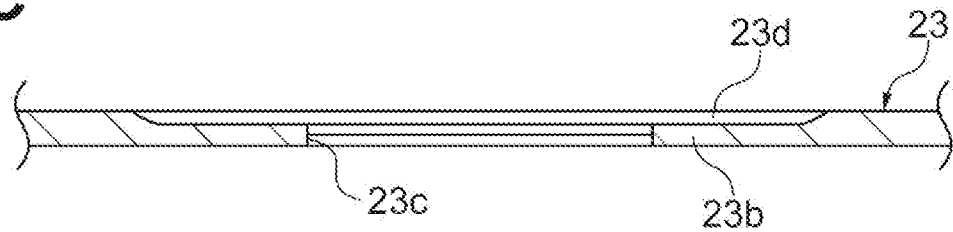
FIG. 3C is an enlarged view of a main portion in FIG. 3B.

As shown in FIGS. 1 and 3B, the inner peripheral plate portion 23b is thinner than the outer peripheral plate portion 23a in the axial direction. In some examples, the outer peripheral plate portion 23a has a constant thickness. The inner peripheral plate portion 23b is inclined from an inner peripheral end of the outer peripheral plate portion 23a toward the passage forming hole 23c and becomes thinner toward the passage forming hole 23c. A back surface of the passage forming plate 23 which faces the insertion hole 6a (faces the coil 4) is flat, but a surface of the passage forming plate 23 on the side opposite thereto has a concave portion 23d in the center (FIG. 3A and FIG. 3C). The passage forming plate 23 may protrude from the first opening portion of the motor housing main body portion 6 on the tip end side. Accordingly, a part of the passage forming plate 23 in a thickness direction (the axial direction) may be fitted to the first cylindrical portion 6b.

The passage forming plate 23 is spaced apart from the first bearing plate 19 in the axial direction. The passage forming plate 23 is also spaced apart from the first bearing portion 18 mounted on the first bearing plate 19. Accordingly, a space 24 (second gap) which extends in the radial direction is formed between the passage forming plate 23 and the first bearing plate 19. The opening 20 of the first bearing plate 19 is configured to fluidly couple the insertion hole 6a of the motor housing main body portion 6 with the space 24.

The passage forming hole 23c provided in the passage forming plate 23 is formed around, for example, the rotation axis X. The passage forming hole 23c forms an exhaust port (a first opening) 25 provided on the first end 5a side of the motor housing 5. The exhaust port 25 is fluidly coupled with the insertion hole 6a, the opening 20, and the space 24. The rotating shaft 8 is inserted through the exhaust port 25. In some examples, the exhaust port 25 is smaller than the intake port 14, however the size of the exhaust port 25 may vary in different examples.

The motor housing 5 includes the motor housing main body portion 6, the second bearing plate 12, the first bearing plate 19, and the passage forming plate 23. Additionally, an in-housing or internal passage 50 which fluidly couples the intake port 14 with the exhaust port 25 is formed in the motor housing 5. The in-housing passage 50 is formed in a gap (second gap) between an inner wall surface of the motor housing main body portion 6, the coil 4, the rotating shaft 8, the second bearing plate 12, the second bearing portion 11, the first bearing plate 19, and the first bearing portion 18. The in-housing passage 50 is at least partially formed from a gap (second gap) between the motor housing 5 and the passage forming plate 23.

As shown in FIG. 1, the impeller 2 mounted on the first end portion 8b of the rotating shaft 8 is accommodated in the impeller housing 3. The impeller housing 3 includes an opening 30a which is a suction port provided on the tip end side in the axial direction, an inlet passage 30 which extends from the opening 30a to the base end side, and a diffuser (an annular passage) 29 which is fluidly coupled with the inlet passage 30 and formed to surround the impeller 2. Additionally, the impeller housing 3 may include a scroll 31 which is provided on an outer periphery of the diffuser 29 and which is fluidly coupled with the diffuser 29, and an air outlet which is provided on the downstream side of the scroll 31. The impeller housing 3 includes, for example, an impeller housing main body portion 26 and a disc-shaped closing plate 27 mounted on the base end side of the impeller housing main body portion 26.

The scroll 31 is formed in the impeller housing main body portion 26. The impeller housing main body portion 26 includes a circular opening 30a formed on the tip end side of the inlet passage 30, and a circular opening 39 which faces the opening 30a in the axial direction. In some examples, the circular opening 39 is fluidly coupled with the inlet passage 30, and is formed on the base end side.

The closing plate 27 is disposed on the back surface side of the impeller 2 (the rotor 8a side). The closing plate 27 is fitted in, for example, an opening 39 of the impeller housing main body portion 26 on the base end side. The closing plate 27 and the impeller housing main body portion 26 are fixed to each other by, for example, a bolt or the like. The closing plate 27 includes a first surface 27f provided on the impeller 2 side, and a second surface 27g provided on the motor housing 5 side. The first surface 27f and the impeller housing 3 define the diffuser 29. An O-ring 28 is disposed on an outer periphery of an opening 39 of the impeller housing main body portion 26. The impeller housing main body portion 26 and the closing plate 27 sandwich the O-ring 28 to seal a passage of a main air flow 32.

A concave surface (a facing portion) 27a which is concave toward the impeller 2 side is formed in the second surface 27g. In some examples, the concave surface 27a is disposed between the motor housing 5 and the impeller 2. The first end 5a of the motor housing main body portion 6 is spaced apart from the second surface 27g in the axial direction on the impeller 2 side of the closing plate 27. The first end 5a of the motor housing main body portion 6 is located in a depression formed by the concave surface 27a, such that the concave surface 27a accommodates the first end 5a of the motor housing main body portion 6. The concave surface 27a faces the motor housing 5 on the first end 5a side in the axial direction.

The first end 5a of the motor housing main body portion 6 and the concave surface 27a are spaced apart from each other in the axial direction. An exhaust passage 33 which fluidly couples the exhaust port 25 with the external air is formed between the first end 5a of the motor housing main body portion 6 and the concave surface 27a. The exhaust passage 33 is at least partially formed from a gap (first gap) between the closing plate 27 and the passage forming plate 23.

An example shape of the closing plate 27 will be described in more detail. A circular through-hole 27h is formed in and passes through the center of the closing plate 27 in the axial direction. The boss portion 2a provided on the back surface of the impeller 2 is inserted through the through-hole 27h so that the boss 2a passes through the closing plate 27. A length of the boss portion 2a in the axial direction is substantially equal to that of the through-hole 27h of the closing plate 27 in the axial direction. Accordingly, a part of the back surface of the impeller 2 is located on the motor housing 5 side of the concave surface 27a.

Figure 5:
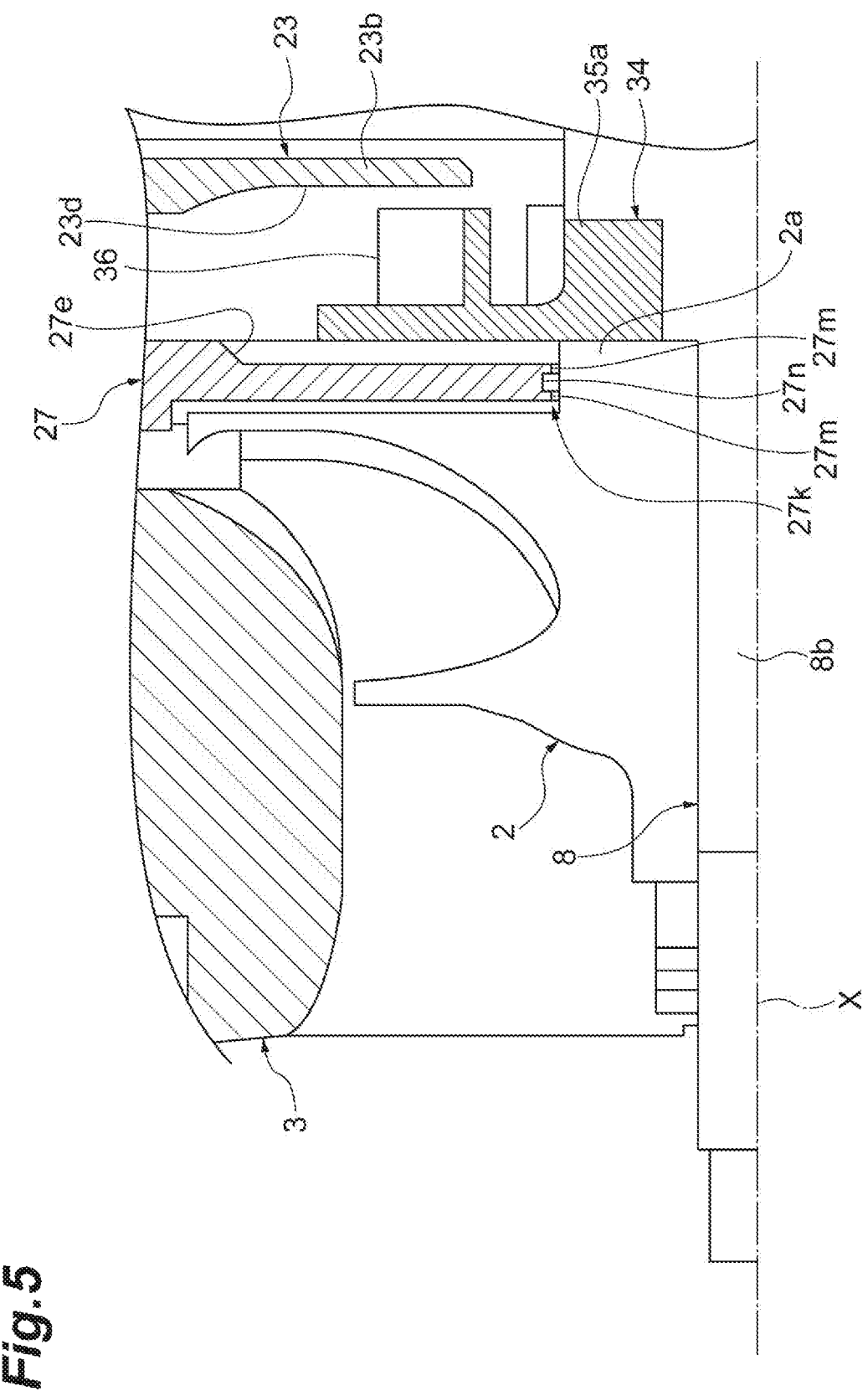
FIG. 5 is a cross-sectional view showing an example seal portion formed around a boss portion of an example impeller.

An example structure of the closing plate 27 around the impeller 2 will be described in more detail with reference to FIG. 5. As shown in FIG. 5, the closing plate 27 includes a seal portion 27k which faces the boss portion 2a of the impeller 2 on the inner diameter side. The seal portion 27k is formed at a peripheral edge portion of the through-hole 27h. The seal portion 27k seals the motor housing main body portion 6 (the motor housing 5) and the impeller 2. The seal portion 27k has an annular concave portion 27n which is spaced outward from the boss portion 2a in the radial direction, and an annular convex portion 27m which is formed on both sides of the concave portion 27n in the axial direction and protrudes from a bottom of the concave portion 27n toward the boss portion 2a of the impeller 2. Accordingly, a groove is formed in an inner peripheral surface of the seal portion 27k in a circumferential direction. The groove of the seal portion 27k may have a rectangular shaped section in the axial direction. The boss portion 2a of the impeller 2 and the convex portion 27m of the seal portion 27k are spaced apart from each other in the radial direction. The seal portion 27k forms a non-contact seal structure between the seal portion 27k and the boss portion 2a of the impeller 2.

As shown in FIG. 1, the concave surface 27a of the closing plate 27 includes a plurality of inclined portions. The concave surface 27a includes a first inclined portion 27b, a second inclined portion 27c, a third inclined portion 27d, and a fourth inclined portion 27e from the outer peripheral side. An annular flat portion is formed between the inclined portions. The first inclined portion 27b and the second inclined portion 27c are located on the outer peripheral side of the first cylindrical portion 6b of the motor housing main body portion 6. The first inclined portion 27b extends from the tip end side (the impeller 2 side) of the first end 5a of the motor housing main body portion 6 to the base end side (the coil 4 side) in the axial direction. A step of the fourth inclined portion 27e is smaller than any of a step of the first inclined portion 27b, a step of the second inclined portion 27c, and a step of the third inclined portion 27d.

The concave surface 27a formed by the inclined portions and the flat portions faces the passage forming plate 23 provided at the first end 5a of the motor housing 5, and the exhaust passage 33 which extends in the radial direction is formed between the concave surface 27a and the passage forming plate 23. The exhaust passage 33 is fluidly coupled with the exhaust port 25 at the center and is fluidly coupled with the external air at the outer peripheral end.

A screw seat portion which protrudes toward the base end at a predetermined angular pitch is formed on the closing plate 27. The closing plate 27 and the motor housing main body portion 6 are fastened with a bolt or the like via the screw seat portion. Alternatively, the closing plate 27 and the motor housing main body portion 6 are fastened with a bolt or the like while the passage forming plate 23 is sandwiched between the screw seat portion and the motor housing main body portion 6. The impeller housing 3 and the motor housing 5 are connected to each other with the closing plate 27 interposed therebetween. Then, the exhaust passage 33 is formed between the passage forming plate 23 and the closing plate 27.

A tip-side middle diameter portion 8d is formed on the tip side of the rotating shaft 8 from the passage forming plate 23. A cooling fan 34 made of, for example, aluminum is fitted and inserted into the tip-side middle diameter portion 8d. The cooling fan 34 is provided in the exhaust passage 33 to face the exhaust port 25.

Figure 4A:
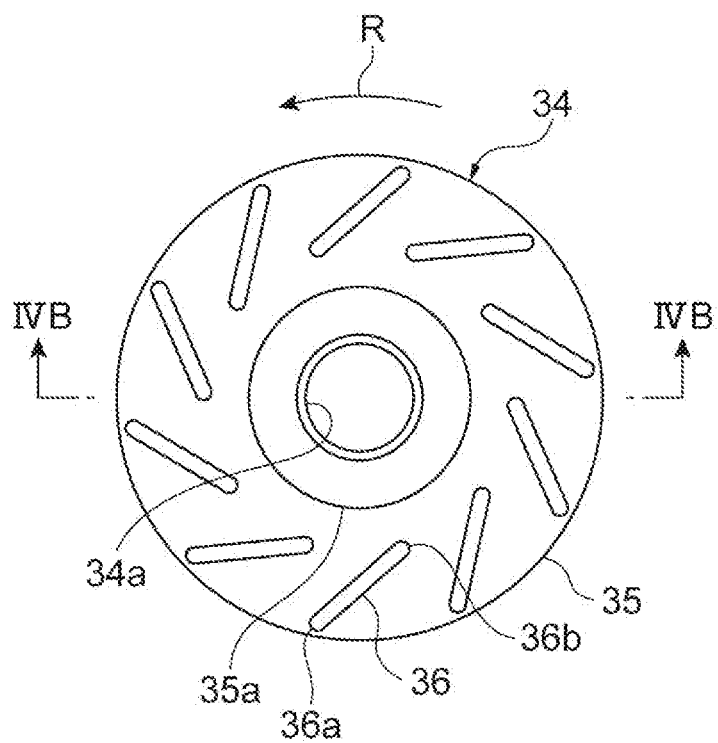
FIG. 4A is a front view showing a cooling fan in FIG. 1.
Figure 4B:
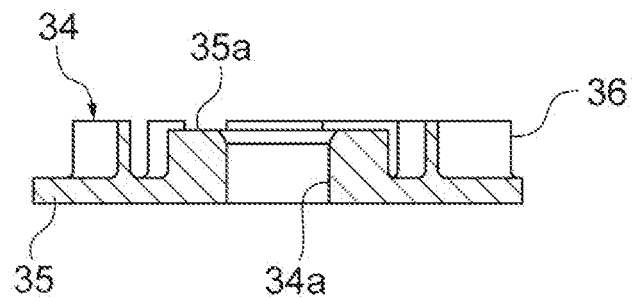
FIG. 4B is a cross-sectional view along line IVB-IVB in FIG. 4A.

As shown in FIGS. 1, 4A and 4B, the cooling fan 34 includes a boss portion 35a through which the tip-side middle diameter portion 8d of the rotating shaft 8 is inserted. An insertion hole 34a is formed in the boss portion 35a, and the tip-end middle diameter portion 8d is inserted through the insertion hole 34a. On the other hand, an annular step portion 8f which is integrally formed with and/or extends contiguously from the tip-side middle diameter portion 8d and which includes a diameter that is larger than that of the tip-side middle diameter portion 8d is formed on the rotating shaft 8. The step portion 8f is located between the motor housing main body portion 6 and the impeller 2 and faces the boss portion 2a of the impeller 2.

Further, a tip-side small diameter portion 8e is formed on the tip end side of the tip-side middle diameter portion 8d. The tip-side small-diameter portion 8e corresponds to the first end portion 8b. The impeller 2 is fitted and inserted into the tip-side small diameter portion 8e. A fastening nut is screwed to the tip end side of the impeller 2. When the fastening nut is tightened, an axial force is generated, and the impeller 2 and the cooling fan 34 are mounted on the rotating shaft 8. Accordingly, a pressing force against the boss portion 2a of the impeller 2 and the cooling fan 34 is generated from the fastening nut. In some examples, the boss portion 35a of the cooling fan 34 and the impeller 2 are held between the step portion 8f of the rotating shaft 8 and the fastening nut.

The impeller 2 presses the boss portion 35a of the cooling fan 34 with the boss portion 2a which is a part of the back surface. A gap is formed between the hub portion of the impeller 2 and the cooling fan 34, and the closing plate 27 is located in the gap.

As shown in FIGS. 4A and 4B, the cooling fan 34 includes the boss portion 35a, an insertion hole 34a formed in the boss portion 35a, a disk portion 35 which extends radially outward from an end surface of the boss portion 35a on the tip side, and a plurality of blade portions (e.g., swirling, mixing or rotating blades) 36 which stand upright on the disk portion 35 and protrude toward the base end. In some examples, the blade portions 36 are mounted on the first end portion 8b of the rotating shaft 8 via the disk portion 35.

The blade portions 36 are disposed between the exhaust port 25 and the exhaust passage 33 and are rotatable with the rotating shaft 8. The boss portion 35a and the blade portions 36 are spaced apart from each other in the radial direction. The plurality of blade portions 36 are spaced apart from each other in the circumferential direction and are disposed, for example, at regular intervals. Each of the blade portions 36 includes an inner end 36b which is located closer to the rotating shaft 8 as compared to an outer end 36a of the blade portions 36 which is located farther from the rotating shaft 8. Additionally, each of the blade portions 36 extends between the inner end 36b and the outer end 36a. The outer end 36a is located upstream from the inner end 36b in the rotational direction R of the rotating shaft 8. Still further, each of the blade portions 36 extends from the inner end 36b toward the outer end 36a in a direction opposite to the rotational direction R. The blade portions 36 extend, for example, near an outer peripheral end of the disk portion 35.

As shown in FIG. 1, the boss portion 35a of the cooling fan 34 is located on the inner peripheral side from the passage forming plate 23. A diameter of the cooling fan 34 is larger than the diameter of the exhaust port 25 of the passage forming plate 23. Additionally, the blade portion 36 may extend to the outer peripheral side further than the passage forming hole 23c (refer to FIG. 3B) of the passage forming plate 23. In some examples, the exhaust port 25 is located inside the outer end 36a of the blade portion 36. The outer end 36a of the blade portion 36 is provided within a range of the concave portion 23d of the passage forming plate 23 in the radial direction. A part of the blade portion 36 (a tip end portion farthest from the disk portion 35 in the axial direction) may be located in, or may be configured to enter, the concave portion 23d of the passage forming plate 23. Accordingly, the concave portion 23d of the passage forming plate 23 may accommodate a part of the blade portion 36.

Next, an example operation of the centrifugal blower 1 will be described. The centrifugal blower 1 can be used, for example, for blowing or suctioning air. When the centrifugal blower 1 is used for blowing air, an object to be blown is provided at an end of an outlet of the main air flow 32 (that is, downstream). When the centrifugal blower 1 is used for suctioning air, an object to be suctioned is provided in front of (that is, upstream of) the suction port (the opening 30a) of the main air flow 32.

When electric power is supplied to the coil 4 from a wiring, a rotating magnetic field is generated between the coil 4 and the rotor 8a of the rotating shaft 8, so that the rotating shaft 8 is made to rotate.

The impeller 2 rotates with the rotation of the rotating shaft 8, and the main air flow 32 is suctioned into the impeller housing 3 by the rotation of the impeller 2. When the centrifugal blower 1 is used for suctioning air, the air is suctioned from a predetermined location or object. When the centrifugal blower 1 is used for blowing air, the main air flow 32 suctioned into the impeller housing 3 is blown to a predetermined location or object to be cooled, via the diffuser 29 and the scroll 31.

Further, the cooling fan 34 rotates with the rotation of the rotating shaft 8. The air inside the motor housing 5 is suctioned from the exhaust port 25 by the rotation of the cooling fan 34. The inside of the motor housing 5 has a negative pressure, and external air is suctioned into the motor housing 5 through the intake port 14 as cooling air 38.

The cooling air 38 suctioned in from the intake port 14 flows between the in-housing passage 50 formed in the motor housing main body portion 6, the coil 4 and the rotor 8a. When the cooling air 38 flows through the in-housing passage 50, the cooling air 38 can also flow through the groove 9 formed in the inner peripheral surface of the motor housing main body portion 6.

The cooling air 38 flowing through the inside of the motor housing main body portion 6 reaches the space 24 via the opening 20. The cooling air 38 which has reached the space 24 is deflected toward the center by the passage forming plate 23. The cooling air 38 deflected toward the center is exhausted from the exhaust port 25 to the outside of the motor housing 5.

The cooling air 38 exhausted from the exhaust port 25 and suctioned into the cooling fan 34 is exhausted outward in the radial direction, flows through the exhaust passage 33, is guided by the concave surface 27a including the plurality of inclined portions and is exhausted to the outside of the centrifugal blower 1.

During an example operation of the centrifugal blower 1, although heat sources such as the coil 4 including the conductive wire and the stator core generate heat, the coil 4 is cooled by the cooling air 38 flowing in the motor housing main body portion 6 and further cooled by the radiation fins 7 which exchange heat with the external air. Heat sources other than the coil 4 include, for example, the rotor 8a including a permanent magnet, the first bearing portion 18, the second bearing portion 11, and an air gap. The air gap is a flow of air which may be generated between the rotor 8a and the coil 4 in the rotational direction (the rotational direction R) of the rotor 8a. The air gap causes windage, or air resistance. Additionally, all of the above heat sources may be cooled directly or indirectly.

In some examples, the intake port 14, the in-housing passage 50, the exhaust port 25, and the exhaust passage 33 are fluidly coupled with each other. When the blade portions 36 rotate together with the rotating shaft 8, the external air is suctioned from the intake port 14 and flows through one or more of the openings and passages described above. When the external air flows in the motor housing 5, the motor 10 including the coil 4 and the rotor 8a can be cooled. Thus, the external air is suctioned into the motor housing 5 as the cooling air 38 separately from the main air flow 32.

The concave surface 27a defines a passage of the main air flow 32 generated by the impeller 2 and a passage of the cooling air 38 flowing in the motor housing 5. Since the boss portion 2a on the back surface of the impeller 2 is located on the motor housing 5 side of the concave surface 27a, a size reduction in the axial direction may be achieved.

The cooling air 38 readily flows in the motor housing 5 through the groove 9 formed in the inner peripheral surface of the motor housing 5 in order to efficiently cool heat sources such as the coil 4. For example, the cooling air 38 flowing in the groove 9 can directly cool the coil 4 and the stator core of the rotor 8a. The cooling air 38 can also indirectly cool the heat sources other than the coil 4 and the stator core.

Since the coil 4 is spaced apart from the first end 5a and the second end 5b of the motor housing 5 in the axial direction, external air is readily introduced into the groove 9 in the motor housing 5 in order to improve the cooling efficiency of the coil 4.

The cooling fan 34 can be mounted on the rotating shaft 8 using the impeller 2 and the step portion 8f provided on the rotating shaft 8 in order to save space in the axial direction.

By inclining the blade portion 36 in the direction opposite to the rotational direction R with respect to the radial direction, the rotation of the blade portion 36 can efficiently generate air flow from the in-housing passage 50 to the exhaust passage 33.

Additionally, by locating the exhaust port 25 inward from the outer end 36a of the blade portion 36, the efficiency of suction of the cooling air 38 from the inside of the motor housing 5 due to the blade portion 36 may be improved.

Further, the cooling fan 34 is provided on the rotating shaft 8 and rotates together with the impeller 2. Therefore, the same motor used for rotating the impeller 2 may be used to rotate the cooling fan 34 in order to reduce manufacturing cost and size of the centrifugal blower 1.

Still further, the centrifugal blower 1 may be configured such that the cooling air 38 can be exhausted outside the motor housing 5 without increasing a size of the cooling fan 34. For example, the passage forming plate 23 may be provided between the impeller housing 3 and the motor housing 5, the exhaust port 25 may be provided between the passage forming plate 23 and the rotating shaft 8, and the cooling fan 34 may be provided to face the exhaust port 25.

Additionally, the centrifugal blower 1 may be configured to reduce or curb interference between the cooling air 38 that is suctioned in by the cooling fan 34 and the cooling air 38 that is exhausted, and to improve exhaust efficiency of the cooling air 38. For example, the exhaust passage 33 may be formed between the passage forming plate 23 and the closing plate 27 of the impeller housing 3, and the passages of the cooling air 38 that are suctioned and exhausted by the cooling fan 34 may be separated by the passage forming plate 23.

Further, the cooling air 38 is exhausted outside the centrifugal blower 1 by the cooling fan 34 and the exhaust passage 33. Accordingly, even when a high-temperature main air flow 32 is introduced from the impeller housing 3, introduction of the main air flow 32 into the motor housing 5 can be reduced or curbed.

It is to be understood that not all aspects, advantages and features described herein may necessarily be achieved by, or included in, any one particular example. Indeed, having described and illustrated various examples herein, it should be apparent that other examples may be modified in arrangement and detail.

For example, a female screw may be formed on the peripheral surface of the through-hole of impeller 2. Then, the impeller 2 may be screwed into the first end portion 8b of the rotating shaft 8 so that the boss portion 35a of the cooling fan 34 is pressed by the boss portion 2a which is a part of the back surface of the impeller 2. Accordingly, the cooling fan 34 can be securely and readily mounted on the rotating shaft 8.

The facing portion which faces the motor housing 5 on the first end 5a side in the axial direction may be formed by the closing plate 27 which is a single member. However, in other examples, the facing portion may be formed by a portion integrally formed with the impeller housing 3 or may be formed by a portion integrally formed with the motor housing 5. Additionally, a member such as the closing plate 27 may be mounted on the motor housing 5. Still further, a concave surface may not be formed on the closing plate 27, and a flat facing portion may instead be provided. The seal portion formed on the closing plate 27 may include other types of seal types in addition to the non-contact type seal portion 27k described herein. For example, when a rotation speed of the impeller 2 is low, the seal portion of the closing plate 27 may form a contact-type seal structure which seals the impeller 2 by being in contact with the boss portion 2a of the impeller 2. The seal portion of the closing plate 27 may be omitted.

In some examples, a centrifugal fan includes the cooling fan 34 which suctions the cooling air 38 from the center and exhausts the cooling air 38 in an outer diameter direction. However, in other examples, the cooling fan 34 may be an axial fan provided in the exhaust port 25 or may be another type of fan. The rotating blade (e.g., truning vane) may be directly mounted on the rotating shaft 8.

In some examples, the impeller 2 has been described as being mounted on the first end portion 8b of the rotating shaft 8, however, the impeller 2 may instead be mounted on the second end portion 8c of the rotating shaft 8. In some examples, the first opening, the exhaust passage, and the rotating blade are provided on the first end 5a side of the motor housing 5, but the impeller 2 is provided on the second end 5b side opposite thereto. Still further, the impeller housing main body portion 26 and the closing plate 27 may include separate bodies. For example, the closing plate 27 is provided on the first end 5a side of the motor housing 5, and the impeller housing main body portion 26 and the impeller 2 are provided on the second end 5b side of the motor housing 5.

In some examples, the cooling structure may include the centrifugal blower 1 as described herein, however in other examples the cooling structure may include a centrifugal compressor. Additionally, the fluid machine may be an axial flow type blower or compressor.

We claim:

1. A fluid machine comprising:
a motor housing comprising a first end and a second end;
a rotating shaft inserted through the motor housing and comprising a protruding portion that protrudes from the first end or the second end of the motor housing in an axial direction of the rotating shaft;
an impeller mounted on the protruding portion of the rotating shaft;
a facing portion of a closing plate that faces the first end of the motor housing in the axial direction;
a first opening located at the first end of the motor housing;
a second opening located at the second end of the motor housing and in communication with external air;
an internal passage formed in the motor housing and configured to fluidly couple the first opening with the second opening;
an exhaust passage formed between the motor housing and the facing portion and fluidly coupled with the first opening to exhaust the external air;
a rotating blade located between the first opening and the exhaust passage, and mounted on the rotating shaft; and
a cooling fan that includes the rotating blade,
wherein the cooling fan comprises a boss portion through which the rotating shaft is inserted,
wherein the impeller is mounted on the protruding portion that protrudes from the first end of the motor housing,
wherein the rotating shaft comprises a step portion that faces a back surface of the impeller, and
wherein the cooling fan is mounted on the rotating shaft by the boss portion that is sandwiched between the impeller and the step portion of the rotating shaft.

2. The fluid machine according to claim 1,
wherein the protruding portion protrudes from the first end of the motor housing,
wherein the facing portion is located between the motor housing and the impeller, and
wherein a part of the impeller passes through a through-hole in the closing plate and extends to the facing portion.

3. The fluid machine according to claim 1,
wherein a drive coil is fixed to an inner peripheral surface of the motor housing, and
wherein the motor housing comprises a groove which is formed on the inner peripheral surface and extends in the axial direction over a region of the motor housing in which the drive coil is provided.

4. The fluid machine according to claim 3, wherein the drive coil is spaced apart from both the first end and the second end of the motor housing in the axial direction.

5. The fluid machine according to claim 1,
wherein the impeller is screwed into the protruding portion, and
wherein the back surface of the impeller is pressed against the boss portion of the cooling fan.

6. The fluid machine according to claim 1,
wherein the rotating blade comprises an inner end portion which is closer to the rotating shaft than an outer end portion of the rotating blade which is farther from the rotating shaft, and
wherein the outer end portion is located upstream from the inner end portion in a rotational direction of the rotating shaft.

7. The fluid machine according to claim 6, wherein the first opening is located inward from the outer end portion.

8. The fluid machine according to claim 1, further comprising a seal portion formed on an inner diameter side of the facing portion and configured to seal both the motor housing and the impeller.

9. The fluid machine according to claim 1, further comprising a passage forming plate located between the motor housing and the closing plate,
wherein the exhaust passage is at least partially formed from a first gap between the closing plate and the passage forming plate, and
wherein the internal passage is at least partially formed from a second gap between the motor housing and the passage forming plate.

10. The fluid machine according to claim 1,
wherein the rotating blade is configured to draw the external air into the second opening in response to a rotation of the rotating shaft, and
wherein the external air that is drawn into the second opening by the rotating blade flows through the internal passage of the motor housing, and is exhausted out of the first opening into the exhaust passage.

11. A fluid machine comprising:
a motor housing;
an impeller housing;
a rotating shaft inserted through the motor housing and the impeller housing;

an impeller mounted on the rotating shaft in the impeller housing;
a closing plate located between the motor housing and the impeller housing;
a cooling fan mounted on the rotating shaft;
an intake port configured to draw external air into an internal passage of the motor housing in response to a rotation of the cooling fan; and
an exhaust port configured to exhaust the external air,
wherein the external air that is drawn into the intake port passes through the internal passage of the motor housing, and is exhausted out of the exhaust port into an exhaust passage,
wherein the exhaust passage comprises a gap between the motor housing and the closing plate,
wherein the cooling fan includes a rotating blade,
wherein the cooling fan comprises a boss portion through which the rotating shaft is inserted,
wherein the impeller is mounted on the protruding portion that protrudes from the first end of the motor housing,
wherein the rotating shaft comprises a step portion that faces a back surface of the impeller, and
wherein the cooling fan is mounted on the rotating shaft by the boss portion that is sandwiched between the impeller and the step portion of the rotating shaft.

12. The fluid machine according to claim 11, further comprising:
a drive coil configured to rotate the rotating shaft, the impeller and the cooling fan; and
a groove located on an interior surface of the motor housing,
wherein the drive coil and the groove are spaced apart from each other, and
wherein the internal passage is located between the drive coil and the groove.

13. The fluid machine according to claim 12, wherein the groove extends in an axial direction of the rotating shaft.

14. The fluid machine according to claim 13, wherein the groove extends in the axial direction over a region in which the drive coil is provided so as that a length of the groove is longer than a length of the drive coil in the axial direction.

15. The fluid machine according to claim 12, wherein the groove extends spirally around a rotation axis of the rotating shaft.

16. The fluid machine according to claim 12,
wherein the motor housing comprises a plurality of the grooves located on the interior surface of the motor housing, and
wherein one or more of the plurality of grooves are longer than a length of the drive coil in the axial direction.

17. The fluid machine according to claim 16, wherein the plurality of grooves extend in the axial direction and are parallel to each other.

18. The fluid machine according to claim 11, further comprising a passage forming plate located between the motor housing and the closing plate,
wherein the gap of the exhaust passage is formed between the closing plate and the passage forming plate, and
wherein the internal passage is at least partially formed from a second gap between the motor housing and the passage forming plate.

19. The fluid machine according to claim 18,
wherein the passage forming plate is attached to the motor housing,
wherein the exhaust port is formed through the passage forming plate, and
wherein the rotating shaft passes through the exhaust port.

* * * * *